Nov. 16, 1965 N. T. CRICHTON Re. 25,903

REFRACTORY ROOF

Original Filed Jan. 3, 1964 2 Sheets-Sheet 1

INVENTOR.
NEIL T. CRICHTON
BY William C. Nealon
ATTORNEY

REFRACTORY ROOF

Original Filed Jan. 3, 1964 2 Sheets-Sheet 2

INVENTOR.
NEIL T. CRICHTON
BY William C. Dealer
ATTORNEY

United States Patent Office

Re. 25,903
Reissued Nov. 16, 1965

25,903
REFRACTORY ROOF

Neil T. Crichton, Detroit, Mich., assignor to Harbison-Walker Refractories Company, a corporation of Pennsylvania Original No. 3,187,696, dated June 8, 1965, Ser. No. 335,555, Jan. 3, 1964. Application for reissue June 30, 1965, Ser. No. 469,976
7 Claims. (Cl. 110—99)

Matter enclosed in heavy brackets [ ] appears in the original patent but forms no part of this reissue specification; matter printed in italics indicates the additions made by reissue.

The present invention relates to furnace roof construction, and is particularly directed to the construction and suspension of basic brick units for such roofs.

In the production, refinement, and other treatments of various metals, the construction and maintenance of the roof of the furnace employed constitutes a substantial element in the cost of such operations. Many proposals have been made for reducing such cost and increasing the efficiency of operation of roofs of this character. For example, sockets have been formed in, or lugs on, the brick for receiving the suspending means, and the adjoining faces of brick have been corrugated to receive and hold a suspending metal plate. Brick for use in furnace arched roofs have been given various interlocking shapes.

A conventional procedure for installing many prior basic roofs of the sprung arch type, whether suspended or unsuspended, was to provide wooden forms on which bricks were placed. Many such roofs used I-beams running from end to end longitudinally of the furnace axis and at different horizontal levels, depending upon the arch, to form the roof contour. These beams were in turn mounted, sometimes yieldingly, on a rigid furnace superstructure. The plates were also provided between courses of brick and perpendicular to the I-beams, at spaced intervals. Frequently, the brick were suspended from the tie plates individually on wire hangers. Also, the individual brick had been notched in some manner, and thereby weakened, to provide for hanging or suspension.

Metal encased refractory brick were often suspended by hangers from overhead supports. Usually the hangers were relatively expensive separate castings that had to be hooked into the blocks as the roof was being formed. This required the handling of a large number of separate articles and the separate connection of each hanger to an individual block by the workmen hanging the roof, all of which was time consuming.

Other methods have also been proposed, for example, see Patent 3,092,051. Here it was proposed to fabricate a furnace roof by disposing adjacent courses of brick, so that each course was secured to a steel beam by the use of hanger members which were integral with the metal casing on the brick. Each of the brick in the structure requires one or more hanger members throughout the entire roof. It is, thus, apparent that the cost involved in fabricating such a roof is high in materials and labor.

Accordingly, it is an object of this invention to provide a new sprung arch furnace roof construction which may be installed readily at a minimum cost and with a minimum number of parts.

Another object of the invention is to provide hanger tabs integral with the metal plate on one end of a brick and to unite the same to a supporting structure.

A still further object of the invention is to construct a basic furnace roof using ribs consisting of at least one row of supported brick attached to a supporting structure running above the same by hanger tabs integral with the metal surface plate on the brick and having an intervening row of rows of brick relatively shorter than those first mentioned and free from separate suspension.

Other objects of the invention will appear hereinafter.

In order to understand more fully the nature and objects of the invention, reference should be had to the following detailed description and drawings of which:

In accordance with the present invention, a series of spaced brick suspending means extend over a furnace and terminate at skewbacks disposed on sides of the furnace. Each beam contains a flange extending horizontally in opposite directions. A series of adjacent, alternately arranged rib and valley courses of metal encased basic brick (i.e. two-rib, four-valley sequence) are disposed below the suspending beams. The brick in the rib course are in contiguous relation with the undersurface of the flange at one end surface of the brick. The brick in each rib and valley course across the span of the arch are in contiguous relation with the next adjacent brick in the same course at the side surfaces thereof. The brick in adjacent courses are in contiguous relation with each other at the face surfaces thereof. Each brick in the rib course contains an L-shaped hanger tab that is integral with the metal casing and projects upward from the face surface of the brick that abuts the brick in the next adjacent valley course. The hanger tab is such that a portion of the L-shape is bent normal to the remainder of the tab so as to be engageable with the flange of the beam, the bent portion being in a plane normal to the undersurface of the flange.

Thus, all of the brick in the rib courses are fixed in place by means of the hanger tabs. The brick in the rib courses project above the upper end surfaces of the brick in the valley courses and the inner surface of the roof is smooth. Brick in the valley courses may be supported or sprung in the usual manner employing skewbacks. However, since all of the brick in adjacent courses are in contiguous relation with each other, in operation, the metal clad brick fuse together and bridge across the adjacent brick courses to assist in supporting the valley course brick without external support means. Rib and valley course patterns are advantageous since, in service, as the roof gradually wears thinner, the brick in the ribs remains strong even after the intervening valley had become quite thin. The stability of the ribs is especially advantageous if the roof wears away much more rapidly in some places than others. Their additional strength is very helpful when roofs must be patched.

Figure 1:
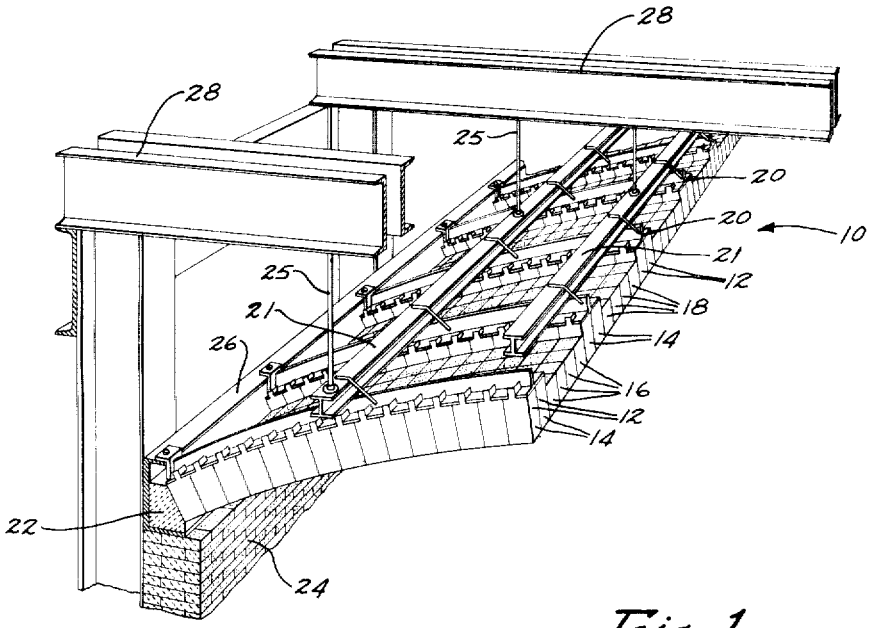
FIG. 1 is a fragmentary perspective view of a roof of an open hearth furnace constructed in accordance with the invention showing the manner in which basic brick are secured in place.

In FIG. 1, an arched roof for an open hearth furnace is generally indicated at 10. However, it should be understood that the improved construction may be used for the roof of other metallurgical furnaces. It is composed of a plurality of spaced rib courses 12 containing brick 14 with adjacent arched valley courses 16 containing brick 18 disposed therebetween. The rib courses 12 differ from the valley courses 16 in that the brick 14 are longer than those forming the courses 16. Each rib course 12 includes a plurality of similar keyed brick 14 which are separately attached to an arched support beam 20.

A plurality of beams 20 are disposed at longitudinally spaced intervals across the top of the furnace roof 10 and are secured at front and back walls in a similar manner.

The courses 12 and 16 of brick 14 and 18 respectively, rest upon skewbrick 22 which in turn rest upon a front wall 24 and similarly on the back wall (not shown) of the furnace. In addition, the lower front ends of the arched beams 20 are fixedly attached to the upper flange of a channel member 26 above the skews 22.

Figure 2A:
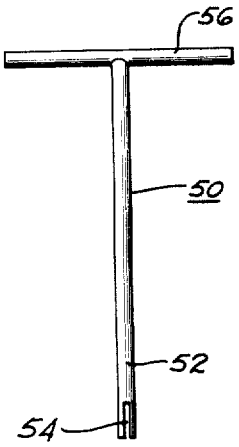
FIG. 2A is an elevation view of a typical tool which may be employed in carrying out the invention.
Figure 2:
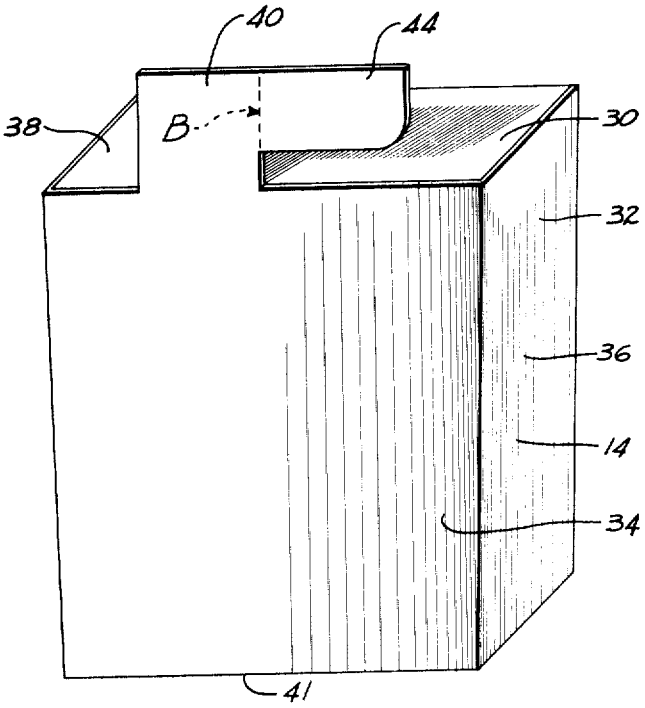
FIG. 2 is a perspective view of a metal encased, keyed basic brick of regular construction having integral metal hanger tabs and employed in the improved roof construction.

As shown in FIG. 2, each regular brick 14 in the ribs is composed of a solid, unnotched block, internally plated or reinforced, if desired, of refractory material 30, such as, magnesite, chrome ore, mixtures thereof and the like contained within a metal casing 32 on the face surfaces 34 and on the side surfaces 36 of the brick. However, it should be appreciated that a lesser number of face surfaces and side surfaces can be metal encased as long as at least one face surface contains a metal plate. The upper and lower ends 38 and 41 respectively of the brick are not encased. In addition, the casing 32 is provided with a hanger tab 40 projecting upwardly from the face surface 34 of the brick, which is preferably integral with the casing. However, the hanger tab 40 may be a separate metal piece secured to the casing as by welding, where the tab cannot be fabricated readily as an integral part of the casing.

Initially the hanger tabs 40 are of an L-shape, extending upwardly in two dimensions from the face surface 34 of the brick, the tab preferably being of substantially the same thickness as the metal plate. A portion 44 of the hanger tab is then bent normal to the remainder, approximately at the dotted line B in the drawing to provide an L-shape in three dimensions so that the hanger tabs 40 can be engaged with the flange 42. The hanger tab may contain means at B to facilitate bending by hand such as continuous perforations or a corrugation. Absent the bending means any suitable mechanical means may be employed to bend the tab.

A particularly convenient tool for this purpose is one shown in FIG. 2A. The tool 50 consists of a rod 52 having a slot 54 at the lower end thereof and a handle 56 at the upper end. In use, the slot 54 is placed over the portion 44 of hanger tab 40 and the handle 56 is turned about 90 degrees.

The brick 14 have a keyed shape with the upper end 38 between side surfaces 36 being thicker than the lower end 41, so that when placed together the bricks form the arched rib courses 12 as shown in FIG. 1. The brick 18 in the valley courses 16, shown more clearly in FIG. 3, are of similar shape to the brick 14 in the rib courses 12, except that these brick are smaller in size from end to end and do not contain hanger tabs.

Figure 3:
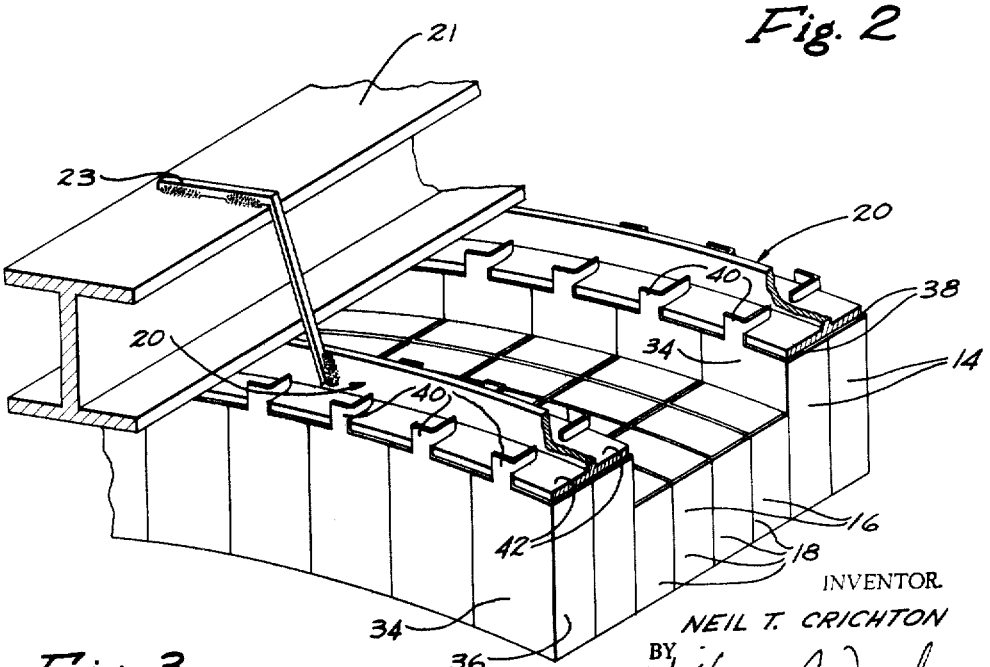
FIG. 3 is an enlarged fragmentary perspective view showing the manner in which the brick are assembled.

The manner in which the brick 14 in rib courses 12 are attached to the arch beams 20 is also more particularly shown in FIG. 3. Each beam 20 is in the shape of an inverted T. As an alternative, the beam 20 may be an H or I-beam preformed to the radius of the desired arch. Each brick 14 in the rib courses 12 is secured by the tabs 40 to a flange 42 extending from one of the opposite sides of the axis of the beam 20.

The bent portion 44 of the hanger tab 40 is disposed on the flange, so that the bent portion is in a plane normal to the undersurface of the flange. The flange 42 preferably has an undersurface of sufficient area to cover the upper ends 38 of each pair of brick in the rib course. The brick 14 in each rib course 12 abut, or are in contiguous relation with, next adajcent brick in the same course, so that the brick are held in place to prevent them from slipping out of hooked engagement with the flange 42. The brick 18 in the valley course are held in place in the usual manner by the use of the skewback or by fusion to brick 14.

Also, the brick in each individual course are in contact with one or more of the brick in adjacent courses at the face surfaces 34, so that in operation, the metal-clad basic brick fuse together and bridge across the adjacent brick courses to assist in supporting the basic brick without external support means. The upper ends 38 of each brick 14 in the rib courses 12 are in flat surface abutment with the undersides of the flanges 42 of the T-beams; and, as shown in FIG. 1, the opposite ends of the beam 20 are secured to channel members 26 or the like so that each beam is held in place. Thus, the brick 14 in the rib courses will not rise due to an expansion of the lower end portions of the brick, as was the case in prior basic brick roofs. Also, the brick 14 in the rib courses 12, owing to their contiguous relation with the brick 18 in the valley courses 16, will tend to support these brick and prevent them from heaving or swelling upwardly. It is preferred, to maintain the structural integrity of the furnace roof, that the brick be laid in a two-rib, four-valley sequence.

The beams 20 perform the double function of holding up and holding down each individual brick in the rib course. As shown in FIGS. 1 and 3, beams 20, in turn, are held in a fixed position by beams 21, which are secured thereto by straps 23. The beams 21 are secured to the furnace superstructure 28 by means of rods 25.

A description of the improved open hearth roof construction is by way of example, and the scope of the invention is not limited to the exact details illustrated, or to the specific sizes of brick and roof shown, or to the particular refractory composition of basic brick described, since these details, sizes and composition may be varied to suit the conditions or specification of any particular furnace involved.

It is therefore intended that the above description and drawings be construed as illustrative and not in limitation of the invention.

I claim:

1. In a furnace roof construction, a series of spaced, brick suspending beams extending over the furnace, each beam having a flange extending laterally in opposite directions, a series of adjacent, alternately arranged rib and valley courses of metal encased basic brick, each brick having generally opposed end, face and side surfaces, the brick in the rib course being in contiguous relation with the undersurface of the flange at one end surface thereof, the brick in each individual course across the span of the arch being in contiguous relation at the side surfaces thereof, the brick in adjacent courses being in contiguous relation at the face surfaces thereof, each brick in the rib course only, having an L-shaped hanger tab integral with the casing, projecting upwardly from the face surface of the brick that is contiguous with the brick in the valley course, the hanger tab being characterized by having a portion of the L-shape bent normal to the remainder and engaged with the flange of the beam, the bent portion being in a plane normal to the undersurface of the flange.

2. The construction defined in claim 1, in which the ribs and valleys contain 2 courses and 4 courses, respectively, in sequence.

3. The construction defined in claim 1 in which a series of spaced support beams are disposed above and in close abutment with the brick suspending beams and are normal thereto.

4. In a basic furnace roof construction, a series of spaced, brick suspending beams extending over the furnace and having opposite ends terminating at skewbacks disposed on sides of the furnace, each beam having a flange extending laterally in opposite directions, a series of adjacent, alternately arranged rib and valley courses of metal encased basic brick, each brick having generally opposed end, face and side surfaces, the brick in the rib courses being in contiguous relation with the undersurface of the flange at one end surface thereof, the undersurface of the flange being of sufficient area to cover completely the end surfaces of a pair of brick in adjacent rib courses, the brick in each individual course across the span of the arch being in contiguous relation at the side surfaces thereof, the brick in adjacent courses being in contiguous relation at the face surfaces thereof, each brick in the rib course only, having an L-shaped hanger tab integral with the casing, projecting upwardly from the face surface of the brick that is contiguous with the brick in the valley course, the hanger tab being characterized by having a portion of the L-shape bent normal to the remainder and engaged with the flange of the beam, the bent portion being in a plane normal to the undersurface of the flange, the extent of the bent portion being less than the distance between face surfaces of a brick.

5. In a furnace roof construction, a series of spaced, brick suspending beams, each beam having a center web portion and having flanges extending laterally in opposite directions from the web portion, the flange having an undersurface of substantial area, a series of adjacent, alternately arranged rib and valley courses of metal encased keyed basic brick, the sequence being 2-rib and 4-valley courses, each brick having generally opposed end, face and side surfaces, the brick in the rib course being in contiguous relation with the undersurface of the flange at one end surface thereof, said relation holding the brick in lateral alignment with their corresponding beams, the brick in each individual course across the span of the arch being in contiguous relation at the side surfaces thereof, the brick in adjacent courses being in contiguous relation at the face surfaces thereof, each brick in the rib course only having an L-shaped hanger tab integral with the casing projecting upwardly from the face surface of the brick that is contiguous with the brick in the valley course, the hanger tab being characterized by having a portion of the L-shape bent normal to the remainder and engaged with the flange of the beam, the bent portion being in a plane normal to the undersurface of the flange.

6. A basic refractory brick comprising a body of basic refractory, the brick having generally opposed end, face and side surfaces, a metallic plate *contained* on a face surface of the brick [comolded therewith], an L-shaped hanger tab integral with the plate projecting upwardly from the face surface of the brick, the hanger tab being characterized by having a portion of the L-shape bent normal to the remainder and to the horizontal.

7. In a furnace roof construction, a series of spaced, brick suspending beams extending over the furnace each beam having a pair of flanges extending laterally in opposite directions, a series of adjacent, alternately arranged rib and valley courses of metal encased basic brick each brick having generally opposed end, face and side surfaces, the brick in the rib course being in contiguous relation with the undersurface of the flange at one end surface thereof, the brick in each individual course across the span of the arch being in contiguous relation at the side surfaces thereof, the brick in adjacent courses being in contiguous relation at the face surfaces thereof, each brick in the rib course only having an L-shaped hanger tab integral with the casing and of substantially the same thickness projecting upwardly from the face surface of the brick that is contiguous with the brick in the valley course, the hanger tab having a means to facilitate bending of a portion in a plane normal thereto, the hanger tab being characterized by having a portion of the L-shape bent normal to the remainder at the bending means and engaged with the flange of the beam, the bent portion being in a plane normal to the undersurface of the flange.

References Cited by the Examiner

The following references, cited by the Examiner, are of record in the patented file of this patent or the original patent.

UNITED STATES PATENTS

| | | | |
|---|---|---|---|
| 2,158,759 | 5/1939 | Morlock | 110—99 |
| 2,929,343 | 3/1960 | Hutter | 110—99 |
| 2,932,265 | 4/1960 | Heuer | 110—99 |
| 3,092,051 | 6/1963 | Shapona et al. | 50—396 X |

FOREIGN PATENTS

| | | |
|---|---|---|
| 634,487 | 1/1962 | Canada. |
| 1,248,126 | 10/1960 | France. |

FREDERICK L. MATTESON, Jr., *Primary Examiner.*